US 8,924,848 B2

(12) United States Patent
Klinger (10) Patent No.: US 8,924,848 B2
(45) Date of Patent: Dec. 30, 2014

(54) SYNCHRONIZING A USER INTERFACE AREA

(75) Inventor: Uwe Klinger, Bad Schoenborn (DE)

(73) Assignee: SAP SE, Walldorf (DE)

(*) Notice: Subject to any disclaimer, the term of this patent is extended or adjusted under 35 U.S.C. 154(b) by 123 days.

(21) Appl. No.: 13/549,567

(22) Filed: Jul. 16, 2012

(65) Prior Publication Data

US 2014/0019890 A1  Jan. 16, 2014

(51) Int. Cl.
*G06F 3/048* (2013.01)
*G06F 17/30* (2006.01)
*G06F 9/44* (2006.01)

(52) U.S. Cl.
CPC ........ *G06F 17/30569* (2013.01); *G06F 9/4443* (2013.01)
USPC .......................................... 715/235; 715/762

(58) Field of Classification Search
CPC .................................. G06F 17/30569
USPC .......................................... 715/235
See application file for complete search history.

(56) References Cited

U.S. PATENT DOCUMENTS

| | | | | |
|---|---|---|---|---|
| 7,366,723 | B2* | 4/2008 | Shaburov | 1/1 |
| 2003/0035003 | A1* | 2/2003 | Marcos et al. | 345/760 |
| 2003/0046286 | A1* | 3/2003 | Jacobs et al. | 707/8 |
| 2003/0193498 | A1* | 10/2003 | Srinivasa et al. | 345/419 |
| 2003/0217331 | A1* | 11/2003 | McKellar et al. | 715/511 |
| 2003/0225826 | A1* | 12/2003 | McKellar et al. | 709/203 |
| 2003/0226106 | A1* | 12/2003 | McKellar et al. | 715/513 |
| 2004/0143606 | A1* | 7/2004 | Pauly et al. | 707/200 |
| 2004/0172598 | A1* | 9/2004 | Hammerich et al. | 715/513 |
| 2005/0229190 | A1* | 10/2005 | Peters et al. | 719/331 |
| 2006/0041623 | A1* | 2/2006 | Danninger | 709/206 |
| 2007/0143301 | A1* | 6/2007 | Tran | 707/10 |
| 2008/0104025 | A1* | 5/2008 | Dharamshi et al. | 707/3 |
| 2008/0162095 | A1* | 7/2008 | Brunswig et al. | 703/6 |
| 2008/0195933 | A1* | 8/2008 | McKellar et al. | 715/234 |
| 2010/0050152 | A1* | 2/2010 | Gilboa | 717/106 |
| 2011/0265020 | A1* | 10/2011 | Fields et al. | 715/760 |
| 2012/0054659 | A1* | 3/2012 | Demant et al. | 715/771 |
| 2012/0150792 | A1* | 6/2012 | Yassin et al. | 707/602 |
| 2012/0173248 | A1* | 7/2012 | Smith | 705/1.1 |
| 2012/0254201 | A1* | 10/2012 | Cochrane et al. | 707/754 |

OTHER PUBLICATIONS

SAP Test Acceleration and Optimization 2.0 (program verified available as of Dec. 2010).*

* cited by examiner

*Primary Examiner* — William Bashore
*Assistant Examiner* — Nathan Shrewsbury (57) ABSTRACT

A user interface (UI) area having multiple data sources is synchronized based upon changes made to UI elements associated with the UI area. To synchronize the changed UI elements, a processor of the computer determines UI controls and data objects associated with the UI area. Based upon a modification to a data object, a corresponding UI control that is affected by the modification is determined. A synchronization process is triggered to determine updated UI controls and updatable UI controls from the UI controls that are affected by the modification. The UI area is synchronized by updating the updatable UI controls based upon the modification.

17 Claims, 4 Drawing Sheets

SYNCHRONIZING A USER INTERFACE AREA

TECHNICAL FIELD

The field generally relates to computer systems and software, and more particularly to software methods and systems to synchronize a user interface area.

BACKGROUND

User interface (UI) technologies focuses on interface technologies that support human-computer interaction. UI technology research focuses on the enabling technologies that help computers hear, see, speak and to understand, and combine these in multimodal ways. Rendering an entity on a UI includes generating a visual representation from a model by using computer programs. Updating the UI indicates that an already displayed visual representation is partially or completely refreshed.

Since the model associated with the UI includes enormous amount of information, updating the UI partially or completely causes a significant information exchange between a server hosting the model and the processor processing the update. Due to the amount of information exchange, there may be an overhead caused on the processor including excessive or indirect computing time, memory, bandwidth and the like. Hence, reducing the amount of data transfer and the overhead while maintaining accuracy in updating the UI is useful.

SUMMARY

Various embodiments of systems and methods to synchronize a computer generated user interface (UI) area are disclosed. The UI area having multiple data sources is synchronized based upon changes made to UI elements associated with the UI area. UI elements associated with the UI area include UI controls and data objects. To synchronize the changed UI elements, a processor of the computer determines UI controls and data objects associated with the UI area to generate a conditional list. Generating the conditional list includes determining events based upon a correlation between the data objects, the UI controls and the UI area. The conditional list represents a qualification of the UI controls and the data objects by verifying whether the UI controls and the data objects reflect any modification performed on the data objects.

Based upon a modification to a data object, an optimized data binding structure is generated to determine a corresponding UI control that is affected by the modification. The optimized data binding structure is generated by distinguishing between data bindings associated with data instances and data bindings associated with iterative data objects. Upon triggering a synchronization process, updated UI controls and updatable UI controls are determined from the UI controls which are affected by the modification. The computer generated UI area is synchronized by updating the updatable UI controls based upon the modification.

These and other benefits and features of embodiments will be apparent upon consideration of the following detailed description of the embodiments thereof, presented in connection with the following drawings.

BRIEF DESCRIPTION OF THE DRAWINGS

The claims set forth the embodiments with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for systems and methods to synchronize a user interface area are disclosed herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
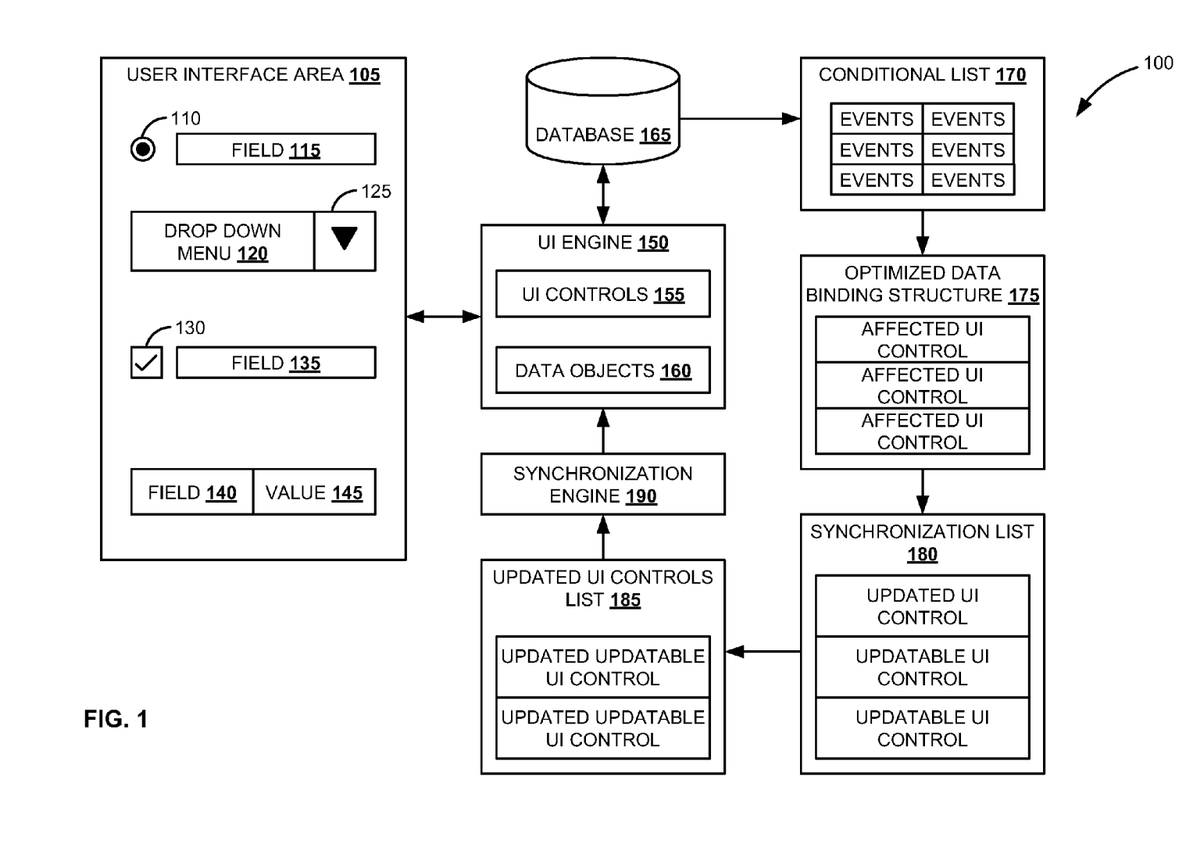
FIG. 1 is a block diagram illustrating an overview of a method to synchronize a user interface area according to an embodiment.

FIG. 1 is a block diagram illustrating an overview of a method to synchronize a user interface area according to an embodiment. The UI area having multiple data sources is regenerated based upon changes made to UI elements associated with the UI area. The UI elements associated with the UI area include UI controls and data objects. UI controls are UI elements that represent arrangements of editable information and hold the data processed by an associated application and the available interactions on this data. Data objects are editable entities representing transitory compilations of attributes of a corresponding UI element. A path that is used to access this data object is called a binding. UI technologies use UI controls as an interface for application development, and a renderer generates a corresponding markup fragment from the UI controls and its properties. Since the UI area has multiple data sources, a mode of data access is specified for accessing the data rather than the actual value. While rendering the UI area, the renderer decodes the specified access (e.g. a path) and determines the actual value. Thus the final UI is a result of the information from both the UI control and the corresponding bound data. When the bound data or the UI control is modified, the UI area is correspondingly updated and regenerated.

In an embodiment, synchronization of the UI area includes regeneration of the UI area. To regenerate the modified UI elements, thereby reducing the CPU usage and the amount of data exchanged, an optimized synchronization process may be employed. To regenerate the UI area with modified UI elements, the UI controls and data objects associated with the UI area are determined to generate a conditional list. Generating the conditional list includes determining events based upon a correlation between the data objects, the UI controls and the UI area. The conditional list represents a qualification of the UI controls and the data objects by verifying whether the UI controls and the data objects reflect any modification performed on the data objects. Based upon a modification to a data object, an optimized data binding structure is generated to determine a corresponding UI control that is affected by the modification. Based upon the determined UI controls, updated and updatable UI controls are determined. An updated UI controls list is computed to include the affected updatable UI controls. Based upon a trigger to synchronize the UI area, the affected updatable UI controls are regenerated on the UI area by updating the affected UI controls based upon the modification.

Computer system 100 comprises a user interface (UI) area 105 including UI elements 110 and 115, 120 and 125, 130 and 135, and 140 and 145. The UI elements may have UI components depending upon the type of UI elements. For instance, if UI element 110 is a radio button, it includes field 115 representing a name of the UI element. The radio button represents the editable entity of the UI element. Similarly, UI element 120 is a drop down menu (editable entity) which includes field 125. UI area 105 is in communication with UI engine 150 that represents a backend structure of UI area 105. UI engine 150 includes UI control 155 representing the UI controls associated with the UI elements (e.g. 110, 125 and 135) and data objects 160 representing the data objects associated with editable entities (e.g. 120, 130 and 145).

Database 165 stores a relationship map of each of the UI elements, corresponding fields and entities, UI controls and data objects. The relationship map may be used to determine interdependencies between UI controls and data objects. Conditional list 170 is generated by determining UI controls and data objects associated with a current instance of the UI area 105. Conditional list 170 includes events which represent a qualification of the UI controls and the data objects. The qualification of each UI control and data object verifies whether the corresponding UI control or data object reflects any modifications performed on the data objects. The qualification verifies the status of the UI element, by determining if the modification in the UI element reflects any modification performed on the data object. For example, conditional list 170 may include events which are triggered by each change in a UI element (UI control and/or data object). Conditional list 170 is maintained in a manner to avoid duplication of event entries, thereby not overloading the processor of the computer system. For instance, if field 115 is modified twice, the latest modification is stored and is represented by a corresponding event.

The relationship between data objects 160 and the UI area 105 may include a complex mapping, and determining a UI control corresponding to a modified data object may be compounded. Complex mapping may also include immutable UI controls and restrict modification to an associated data. To accommodate complex mapping, optimized data binding structure 175 is generated based upon a modification to a data object. Optimized data binding structure 175 is interpreted by detecting the affected UI controls from the modified data objects. The interpretation is accomplished by organizing the bindings between UI controls 155 and data objects 160 in a bi-directional central data structure, where the mapping can be realized via the data objects and via the UI controls.

The interpretation may also be accomplished by building a separate optimized data binding structure containing binding paths of the corresponding UI controls and data objects and the identification of UI controls which are affected due to the modification performed on one or more data objects. Thus, optimized data binding structure 175 includes a list of UI controls 155 which are affected by the modification of one or more data objects 160. Optimized data binding structure 175 is stored until the bindings are changed, and upon any changes to the bindings, optimized data binding structure 175 is updated. In an embodiment, a relationship between the markup fragment of UI area 105 and UI controls 155 are also associated with optimized data binding structure 175.

In an embodiment, the bindings may not specifically refer to a data object. For instance, for a table with multiple rows, each row may represent an instance of the data object, and the corresponding binding path may represent the specific instance. For example, the binding path may be represented as: "TABLE.<row number>.FIELD", and while rendering such a path, the <row number> is replaced by an actual number of the row. For such cases, optimized data binding structure 175 includes a binding path of a corresponding instance of the UI control.

In another embodiment, optimized data binding structure 175 distinguishes between binding to a specific data instance of the data objects and binding to iterative data objects. For the specific data instance of the data object, the data object can be used to trace the affected UI control. For iterative data objects, the instances of the data object are traced to determine the affected UI control. This method of distinguishing between data bindings associated with data instance and data bindings associated with iterative data objects includes a lesser number of mappings when compared to the method of including a binding path for each instance.

Based upon a trigger to a synchronization process, synchronization list 180 is computed to include a list determination of updated UI controls and updatable UI controls from optimized data binding structure 175. An updated UI control may represent a UI control that synchronizes itself by instantaneously regenerating upon any modification of corresponding data object. For instance, consider check box type of UI element 130. When a modification of checking the check box 130 is received on UI area 105, UI 105 area is instantaneously regenerated to display the checked check box 130. Consider a radio button 110. When a modification of selecting the radio button 110 is received on UI area 105, UI area 105 is instantaneously regenerated to display the selected radio button 110. The instantaneous regeneration may include a variation in a visual representation of the radio button 110. For instance, the initial radio button 110 may include a transparent circle, and the selected radio button may include a shaded portion to show the selection made on radio button 110. The modification need not be communicated to a server or any other backend machine (UI engine 150) to determine one or more affected UI controls which are affected by the modification, and further regenerated based upon the modification. This helps in reducing bandwidth utilization and turnaround time of the server machine.

An updatable UI control may represent a UI control that is affected by the modification, and is synchronized upon a trigger to do so. For instance, consider a text box type of UI element having a field 140 and a value 145. When a modification of text present in value 145 or a field 140 is executed on the corresponding UI element, this modification is communicated to UI engine 150 which further communicates the modification to a delta handler to determine UI controls which are affected by the modification. An update interface engine determines the updatable UI controls and the updated UI controls from the UI controls which are affected by the modification, and generates synchronization list 180.

An updated UI controls list 185 is computed to include the affected updatable UI controls which are to be updated to regenerate on UI area 105. In an embodiment, UI control specific business logic is included to notify one or more dependent UI controls based upon updating the affected UI controls. These dependencies may be represented as data bindings or evaluated by the business logic to determine the associated dependent UI controls and to compute updated UI controls list 185. Synchronization engine 190 synchronizes UI area 105 by updating the affected updatable UI controls from updated UI controls list 185 based upon the modification. Synchronizing UI area 105 includes regenerating UI area 105 by updating contents of the affected UI controls.

In an embodiment, synchronizing the UI area includes updating the updatable UI controls. To update the updatable UI controls, UI controls and data objects associated with the corresponding UI area 105 are determined. The modification performed on one or more UI controls 155 associated with the UI area 105 are received. The modification may be performed on a UI control representation of the UI control, which constitutes an external representation of the corresponding UI control. For instance, a UI control representation of a CHECK BOX 130 present on the UI area 105 constitutes an external representation of a UI control 155, which allows a user to make selection of a YES or a NO by checking or unchecking the CHECK BOX 130. Upon receiving a modification of a 'CHECK' to the UI control representation that was 'UNCHECKED', the UI control representation responds to the modification by displaying the checkbox as 'CHECKED', and sends a notification about the modification to a UI engine 150. The modified UI control is registered as 'updated UI control' or as 'synchronized' in the UI engine 150, since the checkbox is already displayed as 'CHECKED'. One or more data objects 160 that are affected by the modification are determined and updated to reflect the modification. For e.g. data object bound to the value of the checkbox is determined and a value TRUE is set to indicate that the checkbox is now checked. The modified data object triggers a notification about the modification to determine one or more affected UI controls. Updated UI controls and updatable UI controls are determined from the group of affected UI controls. The updated UI controls that are registered need not be synchronized. However the updatable UI controls that are not registered are determined as 'to be synchronized'. Upon synchronizing the updatable UI controls based on the modification, the registrations as 'synchronized' and 'to be synchronized' are removed. In an embodiment, the registration is removed prior to a second modification to make the updated UI controls and the updatable UI controls available for modification.

In an embodiment, a complexity of the affected UI controls is computed to determine a degree of regenerating of the UI controls on the UI area 105. The complexity of the affected UI controls includes an amount of modification, a number of cross references or interdependencies of UI controls, a number of UI controls affected, or the like. A degree of regenerating represents a measure of data that needs to be regenerated on UI area 105. For instance, in a UI segment containing twenty UI controls, if seventeen UI controls are affected, the whole UI segment may be regenerated instead of determining conditional list 170, optimized data binding structure 175 and updated UI controls list 185.

In an embodiment, computer system 100 comprises a UI programming model including a user interface phase to receive the modification to data objects 160 associated with UI area 105 and to synchronize the affected UI controls based upon the modification; an update interface phase to the updated UI controls and the updatable UI controls upon a trigger of the synchronization process; and synchronization phase to synchronize the UI area by updating the affected updatable UI controls based upon the modification. In an embodiment, the affected updated UI controls from updated UI controls list 180 is regenerated by queuing the affected updatable UI controls; and synchronizing them at the synchronization phase instead of regenerating each affected UI control upon modification.

In an embodiment, the synchronization process includes synchronizing the UI area associated with a client system with a corresponding application program associated with a server system. For instance, consider a UI area present on a client's system. Based upon a modification performed on the UI area, depending upon the type of associated UI controls (e.g. updated or updatable) of the application program present on a server system, UI area 105 is synchronized. For example, if the associated UI controls are updated, any communication with the server system may be absent, and the client system instantaneously regenerates the updated UI controls on UI area 105. If the associated UI controls are updatable, a communication is established with the server system by generating an updated UI control list 185, and based upon the affected updatable UI controls, UI area 105 is synchronized.

In an embodiment, updated UI controls may not be associated with an ability to instantaneously regenerate. In such cases, the updated UI controls are executed in a manner similar to the updatable UI controls. For instance, consider a drop down menu type of UI element. When a selection of options in the drop down menu is modified, the updated UI control associated with the drop down menu type may instantaneously regenerate the UI control on UI area 105. Even though the updated UI control is instantaneously regenerated on UI area 105, since the option was changed, there may be one or more updatable UI controls that reflect the modification. In such cases, the updated UI control is executed in a manner similar to the updatable UI controls.

In an embodiment, the synchronization process includes cancelling a regeneration of the updated UI control or the updatable UI control based upon a synchronization process triggered between a server-side framework and a client-side framework. Cancelling regeneration represents removing a regeneration notification that is associated with the updated UI control or the updatable UI control upon completing the process of synchronizing the computer generated UI area based upon the modification.

In an embodiment, a data transformation is implemented when an internal representation of data associated is different from a corresponding external representation of data associated with the UI area. For instance, consider an internal representation of a date as YYYYMMDD, and a corresponding external representation of the associated data as "MONTH, DD, YYYY". When a user input received is Apr. 20, 2012, to determine the updated UI controls and the updatable UI controls, a data transformation of the received user input is executed. The data transformation is executed to synchronize the internal representation and the external representation, and further determine the updated UI controls and the updatable UI controls.

Figure 2:
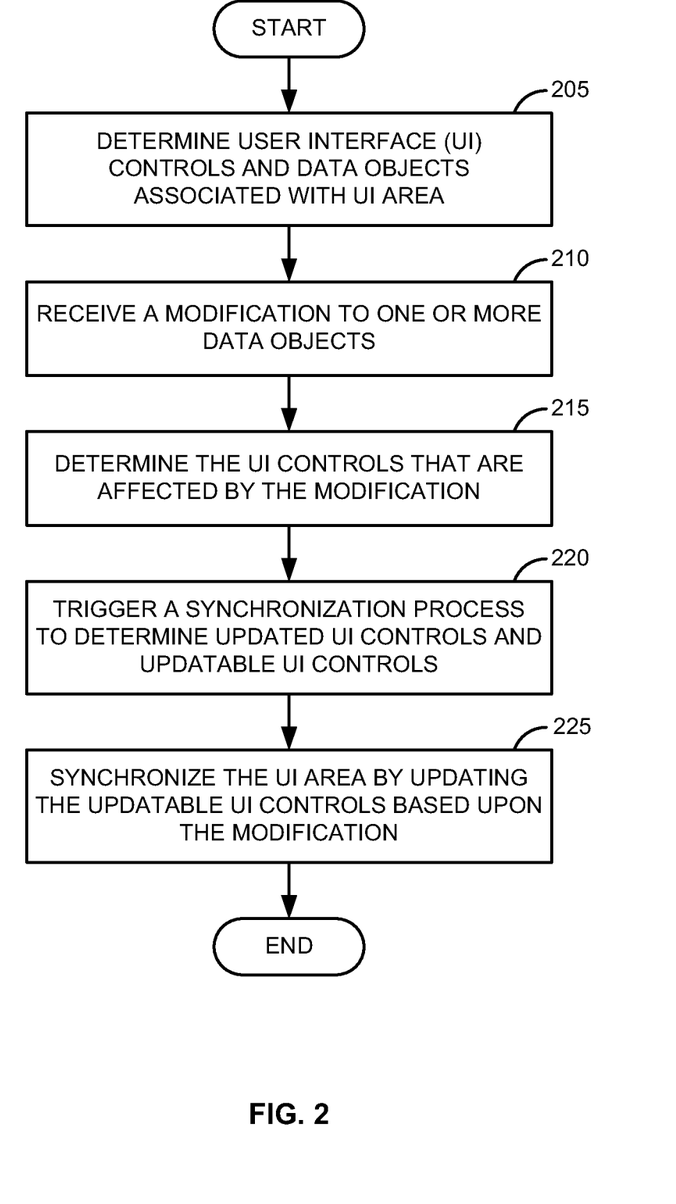
FIG. 2 is a process flow diagram illustrating a computer-implemented method to synchronize a user interface area according to an embodiment.

FIG. 2 is a process flow diagram illustrating a computer-implemented method to synchronize a user interface (UI) area according to an embodiment. At process block 205, UI controls and data objects which are associated with the UI area are determined. In an embodiment, a conditional list of events representing a qualification of the UI controls and the data objects is generated. The conditional list of events are determined based upon a correlation between the data objects and the UI area, a correlation between the UI control and the UI area, or a correlation between the data object and the UI control. The correlation includes a relation between any two or more entities (e.g. UI area, UI controls, and data objects) such that any change in one entity is accompanied by a corresponding change in the other. The qualification of the UI controls and the data objects verifies whether a UI control gets affected when its corresponding data control is modified. Hence, the conditional list includes a list of UI controls that may be affected when their corresponding data objects are modified.

At process block 210, a modification to one or more data objects is received. The modification may be received from the UI or an application associated with the UI. At process block 215, the UI controls which are affected by the modification are determined. In an embodiment, the affected UI controls are determined based upon the conditional list of events. At process block 220, a synchronization process is triggered to determine updated UI controls and updatable UI controls. In an embodiment, an updated UI controls list is computed based upon the affected updatable UI controls. At process block 225, the UI area is synchronized by updating the affected updatable UI controls based upon the modification.

Figure 3:
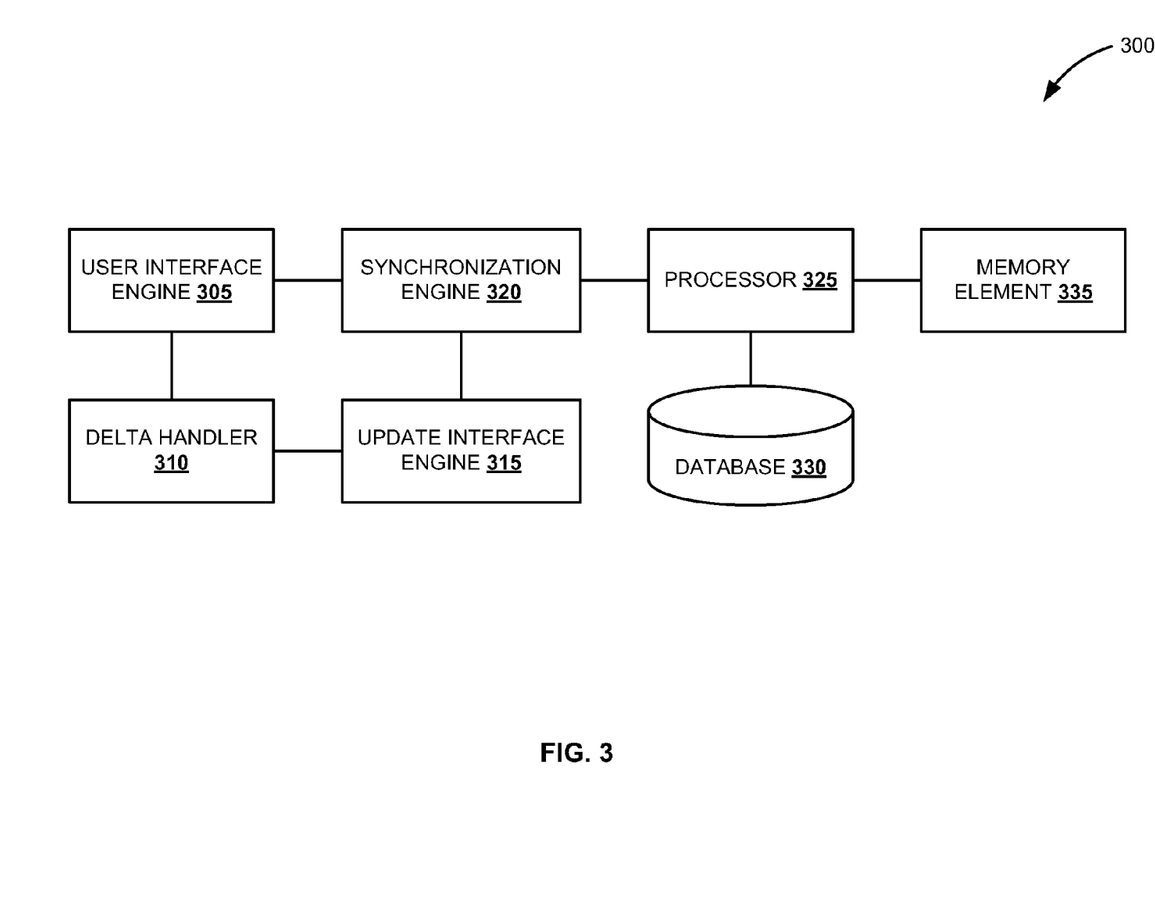
FIG. 3 is a block diagram illustrating a computer system to synchronize a user interface area according to an embodiment.

FIG. 3 is a block diagram illustrating a computer system to synchronize a user interface area according to an embodiment. Computer system 300 includes user interface (UI) engine 305, delta handler 310, update interface engine 315, synchronization engine 320, processor 325, database 330 and memory element 335. In an embodiment, UI engine 305 is in communication with delta handler 310 and synchronization engine 320. Update interface engine 315 is in communication with delta handler 310 and synchronization engine 320. Synchronization engine 320 is in communication with processor 325 of computer system 300. In an embodiment, processor 325 is configured to read and execute instructions stored in memory element 335. The instructions stored in memory element 335 are used to regenerate the UI area according to an embodiment.

A computer generated UI area (interchangeably called a UI area throughout the specification) in communication with UI engine 305 displays one or more UI elements configured to be regenerated on the UI. In an embodiment, to synchronize the UI area, UI engine 305 determines one or more UI controls and one or more data objects which are associated with the UI area. In an embodiment, the data objects and the UI controls associated with the UI area are stored in database 330. In another embodiment, an event handler generates a conditional list of one or more events representing a qualification of the corresponding UI controls and the data objects. These events represent a qualification of the corresponding UI controls and the data objects associated with the UI area. Processor 325 recognizes one or more modification of one or more data objects. Based upon the modifications, a data binder may generate an optimized data binding structure to determine corresponding one or more UI controls which are affected by the modification. In an embodiment, the conditional list and the optimized data binding structure are stored in database 330. Based upon a modification associated with the data object, the respective data is accessed from database 330 to compute the updated UI controls list.

In an embodiment, delta handler 310 determines the UI controls which are affected by the modification. The modification of one or more data objects and the list of UI controls which are affected by the modification are sent to update interface engine 315. Update interface engine 315 determines updated UI controls and updatable UI controls from the list of UI controls and the modification. An updated UI control may represent a UI control that synchronizes itself by instantaneously regenerates upon any modification of corresponding data object. An updatable UI control may represent a UI control that is affected by the modification, and is synchronized upon a trigger to do so.

Update interface engine 315 computes an updated UI controls list including the affected updatable UI controls based upon. Synchronization engine 320 synchronizes the UI area by regenerating the affected updatable UI controls. In an embodiment, regenerating the affected updatable UI control includes updating the affected updatable UI controls based upon the modification. Thus, computer system 300 is utilized to determine the UI controls which are affected by the modification, and the UI area is updated to modify the affected updatable UI controls.

In an embodiment, a server determines the UI controls and the data objects associated with the UI area. The server receives a modification of the one or more data objects to determine the UI controls affected by the modification and identifies the updated UI controls and the updatable UI controls. Based upon a trigger to synchronize, the server receives the trigger and synchronizes with a client system by updating the updatable UI controls based upon the modification.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 4:
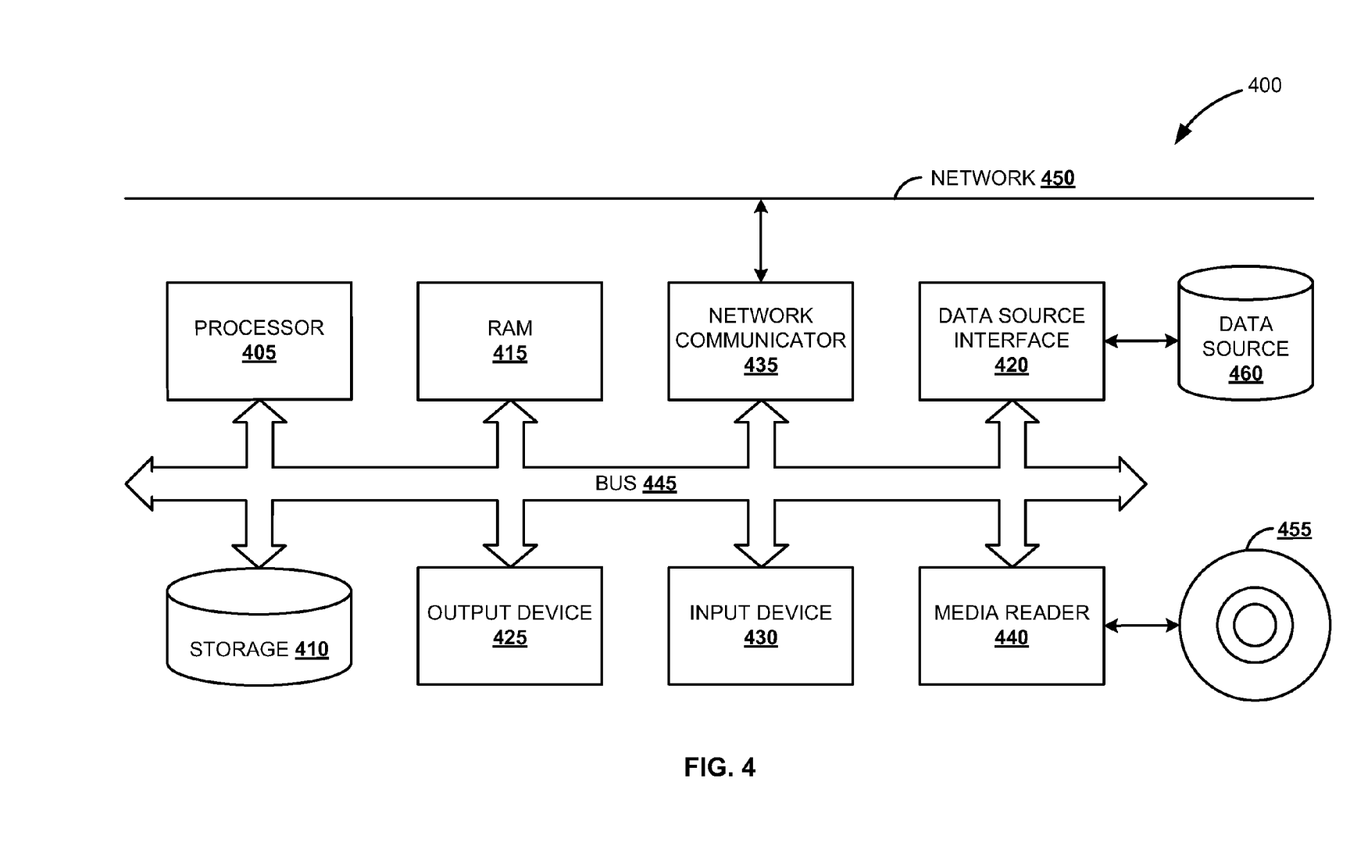
FIG. 4 is a block diagram illustrating an exemplary computer system, according to an embodiment.

FIG. 4 is a block diagram illustrating an exemplary computer system 400, according to an embodiment. The computer system 400 includes a processor 405 that executes software instructions or code stored on a computer readable storage medium 455 to perform the above-illustrated methods. The computer system 400 includes a media reader 440 to read the instructions from the computer readable storage medium 455 and store the instructions in storage 410 or in random access memory (RAM) 415. The storage 410 provides a large space for keeping static data where at least some instructions could be stored for later execution. The stored instructions may be further compiled to generate other representations of the instructions and dynamically stored in the RAM 415. The processor 405 reads instructions from the RAM 415 and performs actions as instructed. According to one embodiment, the computer system 400 further includes an output device 425 (e.g., a display) to provide at least some of the results of the execution as output including, but not limited to, visual information to users and an input device 430 to provide a user or another device with means for entering data and/or otherwise interact with the computer system 400. Each of these output devices 425 and input devices 430 could be joined by one or more additional peripherals to further expand the capabilities of the computer system 400. A network communicator 435 may be provided to connect the computer system 400 to a network 450 and in turn to other devices connected to the network 450 including other clients, continuation servers, data stores, and interfaces, for instance. The modules of the computer system 400 are interconnected via a bus 445. Computer system 400 includes a data source interface 420 to access data source 460. The data source 460 can be accessed via one or more abstraction layers implemented in hardware or software. For example, the data source 460 may be accessed by network 450. In some embodiments the data source 460 may be accessed via an abstraction layer, such as, a semantic layer.

A data source is an information resource. Data sources include sources of data that enable data storage and retrieval. Data sources may include databases, such as, relational, transaction, hierarchical, multi-dimensional (e.g., OLAP), object oriented databases, and the like. Further data sources include tabular data (e.g., spreadsheets, delimited text files), data tagged with a markup language (e.g., XML data), transaction data, unstructured data (e.g., text files, screen scrapings), hierarchical data (e.g., data in a file system, XML data), files, a plurality of reports, and any other data source accessible through an established protocol, such as, Open Data-Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to synchronize a computer generated user interface (UI) area, comprising:
   a processor of a computer determining one or more UI controls and one or more data objects associated with the computer generated UI area;
   based upon a modification of the one or more data objects, the processor
      determining the one or more UI controls affected by the modification, and
      computing a complexity of the one or more UI controls affected by the modification, to determine an associated degree of regeneration;
   triggering a synchronization process to determine one or more updated UI controls and one or more updatable UI controls from the UI controls affected by the modification, wherein the synchronization process includes implementing a data transformation when an internal representation of data associated with the processor is different from a corresponding external representation of data associated with the UI area, by
      determining one or more values associated with the modified data objects,
      determining one or more values associated with the affected updatable UI controls, and
      when the values associated with the modified data objects are different from the values associated with the affected updatable UI controls, triggering a format conversion of the data; and
   based upon the degree of regeneration of the one or more UI controls affected by the modification, regenerating the computer generated UI area by updating the updatable UI controls.

2. The computer implemented method of claim 1, wherein determining the UI controls and the data objects comprises: generating a conditional list including one or more corresponding events based upon a correlation between the data objects and the computer generated UI area, the UI control and the computer generated UI area, and the data objects and the UI control.

3. The computer implemented method of claim 2, wherein the events represent a corresponding qualification of the data objects and the UI controls, and store one or more associations between the one or more data objects and the one or more corresponding UI controls.

4. The computer implemented method of claim 1 further comprising:

generating a data binding structure to determine the corresponding one or more UI controls affected by the modification; and generating an updated UI controls list including the affected UI controls based upon the data binding structure, to re-render the affected UI controls on the computer generated UI area by updating the affected UI controls based upon the modification.

5. The computer implemented method of claim 1, wherein the synchronization process includes: synchronizing the computer generated UI area associated with a client system with a corresponding application program associated with a server system.

6. The computer implemented method of claim 1, wherein the synchronization process includes:

generating a data binding structure to determine the corresponding one or more UI controls affected by the modification;

determining the one or more updated UI controls and the one or more updatable UI controls from the data binding structure;

based upon the data binding structure, filtering the updated controls to generate an updated UI controls list including the updatable UI controls affected by the modification; and regenerating the updatable UI controls affected on the computer generated UI area by updating the affected updatable UI controls based upon the modification.

7. The computer implemented method of claim 1, wherein determining the updated UI controls include: determining one or more instantaneously regenerating UI controls.

8. The computer implemented method of claim 6, wherein the synchronization process includes: regenerating one or more updated UI controls not instantaneously regenerated, to synchronize the computer generated UI area.

9. The computer implemented method of claim 1 further comprising: renewing the UI controls to remove an updated UI control status and an updatable UI control status.

10. The computer implemented method of claim 1 further comprising a UI programming model including:

a user interface phase to receive a modification to one or more data objects associated with the computer generated UI area and to synchronize the computer generated UI area;

an update interface phase to determine updated UI controls and updatable UI controls upon a trigger of a synchronization process; and a synchronization phase to synchronize the computer generated UI area by updating the updatable UI controls based upon the modification.

11. The computer implemented method of claim 1, wherein synchronizing the computer generated UI area comprises: queuing the affected updatable UI controls to synchronize during the synchronization phase.

12. The computer implemented method of claim 1 further comprising:

determining the one or more UI controls and the one or more data objects associated with the computer generated UI area;

upon receiving a modification to a UI control representation of a corresponding UI control on the computer generated UI, transmitting a notification associated with the received modification to register one or more updated UI controls;

updating the one or more data object affected by the modification and triggering a data binding structure to determine the one or more affected UI controls; and determining the one or more updated UI controls and one or more updatable UI controls to update the updatable UI controls based upon the modification.

13. The computer implemented method of claim 1, wherein the synchronization process includes:

removing a regeneration notification associated with the updated UI controls and the updatable UI controls, upon synchronizing the computer generated UI area.

14. A computer system to synchronize a computer generated user interface (UI) area, comprising:

a processor configured to read and execute instructions stored in one or more memory elements; and the one or more memory elements storing instructions to a user interface (UI) engine to determine one or more UI controls and one or more data objects associated with the computer generated UI area, and compute a complexity of the one or more UI controls affected by the modification, to determine an associated degree of regeneration;

a delta handler to determine the one or more UI controls affected by a modification of the one or more data objects;

an update interface engine to determine one or more updated UI controls and one or more updatable UI controls form the one or more UI controls affected by the modification; and a synchronization engine to regenerate the computer generated UI area by updating the updatable UI controls, based upon the degree of regeneration of the one or more UI controls affected by the modification, wherein the synchronization engine implements a data transformation when an internal representation of data associated with the processor is different from a corresponding external representation of data associated with the UI area, by determining one or more values associated with the modified data objects, determining one or more values associated with the affected updatable UI controls, and when the values associated with the modified data objects are different from the values associated with the affected updatable UI controls, triggering a format conversion of the data.

15. The computer system of claim 14 further comprises:

an event handler to generate a conditional list of one or more events representing a corresponding qualification of the UI controls and the data objects; and a data binder to generate an optimized data binding structure based upon a modification of the one or more data objects, and determine corresponding one or more UI controls affected by the modification.

16. The computer system of claim 14 further comprises: a server to determine the one or more UI controls and the one or more data objects associated with the computer generated UI area;

receive a modification of the one or more data objects;

determine the one or more UI controls affected by the modification;

determine the one or more updated UI controls and the one or more updatable UI controls; and synchronize the computer generated UI area with a client system by updating the updatable UI controls based upon the modification.

17. An article of manufacture including a non-transitory computer readable storage medium to tangibly store instructions, which when executed by a computer, cause the computer to:

determine one or more UI controls and one or more data objects associated with a computer generated UI area;

determine the one or more UI controls affected by a modification of the one or more data objects;

compute a complexity of the one or more UI controls affected by the modification, to determine an associated degree of regeneration;

trigger a synchronization process to determine one or more updated UI controls and one or more updatable UI controls from the one or more UI controls affected by the modification, wherein the synchronization process includes implementing a data transformation when an internal representation of data associated with the processor is different from a corresponding external representation of data associated with the UI area, by determining one or more values associated with the modified data objects, determining one or more values associated with the affected updatable UI controls, and when the values associated with the modified data objects are different from the values associated with the affected updatable UI controls, triggering a format conversion of the data; and based upon the degree of regeneration of the one or more UI controls affected by the modification, regenerate the computer generated UI area by updating the updatable UI controls.

* * * * *